(No Model.)
L. E. LEAROYD.
SAFETY STOP FOR ENGINES.
No. 415,277. Patented Nov. 19, 1889.
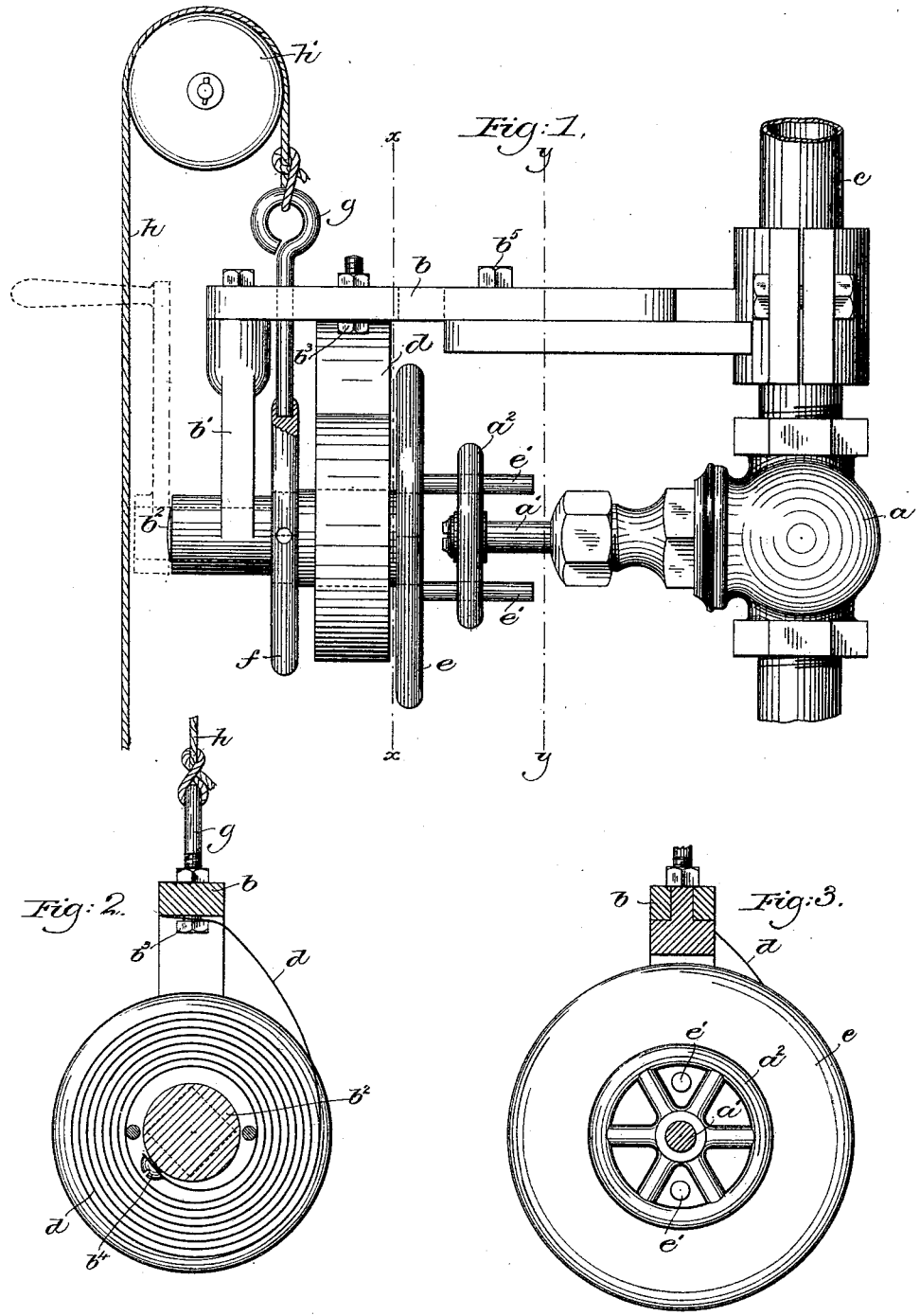
Witnesses.
Frederick L. Emery
Edgar A. Goddin
Inventor.
Lewis E. Learoyd,
by Emery & Gregory
Attys.

UNITED STATES PATENT OFFICE.

LEWIS E. LEAROYD, OF DANVERS, MASSACHUSETTS.

SAFETY-STOP FOR ENGINES.

SPECIFICATION forming part of Letters Patent No. 415,277, dated November 19, 1889.

Application filed July 8, 1889. Serial No. 316,752. (No model.)

*To all whom it may concern:*

Be it known that I, LEWIS E. LEAROYD, of Danvers, county of Essex, State of Massachusetts, have invented an Improvement in Safety-Stops for Engines, &c., of which the following description, in connection with the accompanying drawings, is a specification, like letters on the drawings representing like parts.

Many accidents happening in machine-shops and similar places are attended with serious results because word cannot be given quickly to the engineer to thus have the engine stopped.

Many devices have been constructed by which the valve controlling the engine-supply could be closed from a distant point. Among such devices may be found valves operated by electricity; but so far as I am aware all such devices have been expensive and cannot be readily applied to valves now in use.

This invention has for its object to construct a device for closing valves for supplying power, which may be cheaply made and be readily applied to valves already in use.

In accordance with this invention a coiled spring is attached at one end to a shaft and at the other end to a longitudinally-adjustable support, and means are provided for winding up the spring manually, a locking-pin retaining or holding the spring wound up, a cord attached to the locking-pin being employed to remove the said pin and release the normally-wound-up spring. The shaft referred to is operatively connected with the valve-stem, so as to rotate the latter when the spring recoils.

Figure 1 shows in side elevation a valve and controlling device therefor embodying this invention; Fig. 2, a vertical section of the controlling device shown in Fig. 1, taken on the dotted line $x x$, looking toward the left; Fig. 3, a vertical section of the device shown in Fig. 1, taken on the dotted line $y y$, looking toward the left.

The valve $a$, of any usual or suitable construction and employed as a controlling-valve in the main supply-pipe, is herein represented as an ordinary globe-valve having a rotatable valve-stem $a'$ and hand-wheel $a^2$. An arm $b$ is attached to the pipe $c$ adjustably, said arm supporting at its outer end an arm $b'$, which serves as the bearing for the shaft $b^2$. A spring $d$ is attached at one end to the arm $b$, as at $b^3$, and at the other end to the shaft $b^2$, as at $b^4$. The shaft $b^2$, if quadrangular or other than round shape in cross-section at two points, has applied to it and there secured the wheel or collar $e$ and the wheel or collar $f$. The wheel or collar $e$ is provided with pins $e'$, which pass through recesses in the hand-wheel $a^2$ of the valve, thereby serving to operatively connect the rotatable valve-stem $a'$ with the shaft $b^2$. The spring $d$ is normally wound up by turning the shaft $b^2$ by either hand-wheel $e$ or $f$, and when properly wound a pin $g$ is dropped through an opening in the support $b$, and, as shown, into a recess in the hand-wheel $f$, thereby serving as a locking-pin for the shaft. A cord or chain $h$, passing over any suitable pulley or pulleys, as $h'$, is connected to the pin $g$.

In operation with the parts as represented in Fig. 1—viz., the spring $d$ being wound up—by pulling upon the cord $h$ the locking-pin $g$ is removed, and the spring $d$ in recoiling rotates the shaft $b^2$, and thereby rotates the valve-stem $a'$ and closes the valve.

The cord $h$ may be extended over suitable pulleys to any part of a building.

The arm $b$ is herein shown as composed of two parts adjustably connected together by a set-screw $b^5$.

By loosening the set-screw $b^5$ the controlling device may be readily removed or withdrawn to permit the valve to be closed in the usual manner by hand.

If desired, a crank, as shown in dotted lines, Fig. 1, may be secured to the shaft $b^2$ by which to assist in winding up the spring $d$.

I claim—

1. The controlling-valve having a rotatable valve-stem and hand-wheel $a^2$, combined with the controlling device comprising the rotatable shaft having pins $e'$, engaging said hand-wheel to turn it, but adjustable longitudinally with relation thereto, the spring arranged on said shaft, and locking device for holding the shaft in position with the spring wound, and a cord or equivalent for removing or releasing said locking device, and the longitudinally-adjustable support for said controlling device, substantially as described.

2. The controlling-valve having a rotatable valve-stem, combined with a controlling device consisting of a rotatable shaft operatively connected with the valve-stem and having longitudinal adjustment with relation thereto, a spring arranged on said shaft and normally wound, a locking-pin for said shaft in position with said spring wound and cord or chain for removing it, and a longitudinally-adjustable support for the said controlling device, substantially as described.

3. The controlling-valve having a rotatable valve-stem, a controlling device comprising a rotatable shaft and operatively connected with said valve-stem, a spring coiled on said shaft, and a locking-pin for holding the shaft in position with the said spring wound, combined with the adjustable support for said controlling device, substantially as described.

In testimony whereof I have signed my name to this specification in the presence of two subscribing witnesses.

LEWIS E. LEAROYD.

Witnesses:
BERNICE J. NOYES,
FREDERICK L. EMERY.